(12) United States Patent
Su et al.

(10) Patent No.: US 8,124,674 B2
(45) Date of Patent: Feb. 28, 2012

(54) HALOGEN-FREE RESIN COMPOSITION WITH HIGH FREQUENCY DIELECTRIC PROPERTY, AND PREPREG AND LAMINATE MADE THEREFROM

(75) Inventors: Shi Guo Su, Dongguan (CN); Yue Shan He, Dongguan (CN); Bi Wu Wang, Dongguan (CN); Jie Li, Dongguan (CN); Tao Chen, Dongguan (CN)

(73) Assignee: Guangdong Shengyi Sci. Tech Co., Ltd., Dongguan (CN)

( * ) Notice: Subject to any disclaimer, the term of this patent is extended or adjusted under 35 U.S.C. 154(b) by 32 days.

(21) Appl. No.: 12/695,186

(22) Filed: Jan. 28, 2010

(65) Prior Publication Data

US 2011/0053447 A1   Mar. 3, 2011

(30) Foreign Application Priority Data

Aug. 27, 2009  (CN) .......................... 2009 1 0189765

(51) Int. Cl.
*B32B 27/12* (2006.01)
*B32B 27/38* (2006.01)
*C08K 5/523* (2006.01)
*C08K 5/5313* (2006.01)
*C08L 63/02* (2006.01)
*C08L 63/04* (2006.01)
*C08L 79/04* (2006.01)

(52) U.S. Cl. ..................... 523/450; 428/297.4; 428/414; 523/451; 525/109

(58) Field of Classification Search ........................ None
See application file for complete search history.

(56) References Cited

U.S. PATENT DOCUMENTS

2007/0221890 A1* 9/2007 Gan .............................. 252/601

OTHER PUBLICATIONS

Chemical abstracts registry No. 35948-25-5 for 3,4,5,6-dibenzo-2H-1,2-oxaphosphorin-2-oxide, 2011, one page.*

* cited by examiner

*Primary Examiner* — Robert Sellers
(74) *Attorney, Agent, or Firm* — Weiner & Burt, P.C.; Irving M. Weiner; Pamela S. Burt

(57) ABSTRACT

The present invention relates to a halogen-free resin composition with high frequency dielectric property, and a prepreg and a laminate made therefrom. The halogen-free resin composition with high frequency dielectric property comprises, calculating according to the parts by weight of organic solids: (A) 10-50 parts by weight of copolymer of styrene-maleic anhydride; (B) 10-50 parts by weight of at least one compound having dihydrobenzoxazine ring; (C) 10-50 parts by weight of at least one polyepoxide; (D) 5-30 parts by weight of at least one phosphorus-containing flame retardant. Prepregs and laminates made from the resin composition have low dielectric constant, low dielectric dissipation factor, high glass transition temperature, high heat resistance, low moisture adsorption, and the technological operation is simple.

6 Claims, No Drawings

HALOGEN-FREE RESIN COMPOSITION WITH HIGH FREQUENCY DIELECTRIC PROPERTY, AND PREPREG AND LAMINATE MADE THEREFROM

FIELD OF THE INVENTION

The present invention relates to a resin composition, particularly relates to a halogen-free resin composition with high frequency dielectric property, and a prepreg and a laminate made therefrom.

BACKGROUND OF THE INVENTION

Usually, laminates used in a PCB adopt a halogen flame retardant to prevent burning. When burning, these halogen flame retardants will send out not only a lot of fume that smells awful, but also will produce strong corrosive halogen hydride gases. Furthermore, according to literatures of recent years, halogen flame retardants will produce carcinogens, such as dioxin and dibenzofuran, during high-temperature splitting and burning. Therefore, with the EU directives on WEEE (Waste Electrical and Electronical Equipment) and RoHS (Restriction of Hazardous Substances in Electrical and Electronic Equipment) being put in practice in Jul. 1, 2006, developing halogen-free flame-retardant type laminates used in a PCB has become the key work of the industry.

On the other hand, PCBs are the key electronic part of portable electronic products, satellite transmission products, and communication products, and the performance of PCBs will directly influence the performance of the electronic products. However, the performance depends on the dielectric coefficient and the dielectric loss of the substrate to a great extent, since the signal transmission speed with the formula V=C/s and the loss power with the formula P=kft in a PCB are closely related with them. Thus, the relative dielectric constant is smaller, the transmission of the signal is faster; the dielectric dissipation factor is smaller, the frequency capable to be transmitted is higher when the loss power of the signal remains unchanged during the transmission process. That is, when the signal remains at the same frequency, the dielectric loss is smaller, the distortion rate during the signal transmission process is lower. So, with the development trend of electronic products being thinner, lighter, and smaller, and the transmission frequency being towards GHz (quasi-microwave band), it is very important to develop a new generation of PCB substrate with high performance for high frequency transmission.

In recent years, to improve the performance of the above mentioned copper clad laminate (CCL), the researchers have tried in many ways. It has been researched to adopt high performance resin matrix such as polytetrafluoroethylene resin, bismaleimide triazine resin, thermosetting poly(phenyleneoxide) resin, cyanate ester resin, polyimide, and polyetheretherketone. However, application of the above high performance resin matrix is limited by the factors such as processability and price. Developing epoxy group PCBs for high frequency transmission is the major research direction. Currently, only a few Japanese companies can produce such products. With the further development in communication and information industry such as satellite communication, personal computers, and mobile phones, the requirement to the performance of electronic products is more and more, and so developing an epoxy group PCB for high frequency transmission with comparatively low dielectric coefficient and dielectric loss is necessary.

Patents such as Belgian patent No. 627887, Chinese patent No. 1955219, U.S. Pat. No. 6,534,181B2, and U.S. Pat. No. 6,509,414B2 disclosed to use the copolymer of styrene-maleic anhydride (SMA) to cure epoxy resin. However, the material is inevitable to have a plenty of hydrophilic groups after epoxy resin is cured by anhydride, which results in comparatively large water absorption of the material. Thus, at the condition of high temperature and high humility, the cured epoxy resin is very sensitive to water. Besides, phosphorus-containing flame retardants easily absorb moisture.

SUMMARY OF THE INVENTION

An object of the present invention is to provide a halogen-free resin composition with high frequency dielectric property, which introduces a certain quantity of benzoxazine resin, and copolymer of styrene-maleic anhydride as curing agent of the resin, so as to improve the moisture adsorption, heat resistance, and electrical property.

Another object of the present invention is to provide a prepreg made from the halogen-free resin composition with high frequency dielectric property, which has low dielectric constant, low dielectric dissipation factor, high glass transition temperature, good heat resistance, and low moisture adsorption.

A further object of the present invention is to provide a laminate made from the halogen-free resin composition with high frequency dielectric property, which has low dielectric constant, low dielectric dissipation factor, high glass transition temperature, good heat resistance, and low moisture adsorption.

To achieve the above objects, the present invention provides a halogen-free flame-retardant resin composition, which comprises, calculating according to the parts by weight of organic solids:

(A) 10-50 parts by weight of copolymer of styrene-maleic anhydride;
(B) 10-50 parts by weight of at least one compound having dihydro benzoxazine ring;
(C) 10-50 parts by weight of at least one polyepoxide;
(D) 5-30 parts by weight of at least one phosphorus-containing flame retardant.

The present invention also provides a prepreg made from the halogen-free resin composition with high frequency dielectric property, which comprises a base material, and a halogen-free resin composition with high frequency dielectric property. The resin composition adheres to the base material after the base material is impregnated in the resin composition and then is dried.

The present invention also provides a laminate made from the halogen-free resin composition with high frequency dielectric property, which comprises a plurality of prepregs mutually overlapped. Each prepreg includes a base material, and a halogen-free resin composition with high frequency dielectric property. The resin composition adheres to the base material after the base material is impregnated in the resin composition and then is dried.

The advantages of the present invention are described as follows: 1. The halogen-free resin composition with high frequency dielectric property involved in the present invention adopts styrene-maleic anhydride (SMA), is a high polymer with acid anhydride function. Part of the segments of SMA has the structure of acid anhydride, which can react with benzoxazine and epoxy resin, and part of the segments of SMA has the benzene ring structure of styrene, which provides heat resistance and humidity resistance. SMA not only takes part in curing, but also can form an interpenetrating polymer network (IPN) structure with benzoxazine and epoxy resin. So, it endows the cured resin with good toughness, and at the same time, it also endows the cured resin with heat resistance; meanwhile, the existing of benzene ring structure also controls the moisture adsorption and high-frequency dielectric property of the cured resin. 2. The halogen-free resin composition with high frequency dielectric property involved in the present invention adopts benzoxazine resin that has a certain flame-retardant property itself as the resin, which has a great synergy effect of flame retardant with phosphorus-containing flame retardant. So, the usage amount of phosphorus-containing flame retardant can be greatly reduced, and flame retardant can be achieved without delamination phenomenon and other problems, for example, physical properties like flexural modulus decreased sharply, which are caused by the cured product of acid anhydride, and hygroscopic phosphorus-containing flame retardant. Meanwhile, benzoxazine itself has good moisture adsorption, good heat resistance, and good electrical property. 3. The halogen-free resin composition with high frequency dielectric property involved in the present invention also adopts epoxy resin to greatly improve the processability. Meanwhile, imidazole is adopted as the curing accelerator to control the reaction speed of copolymer of styrene-maleic anhydride, benzoxazine, and epoxy resin by changing the usage amount. 4. So, the prepreg and laminate made from the resin composition have low dielectric constant, low dielectric dissipation factor, high heat resistance, low moisture adsorption, etc., and so overcome the disadvantages of conventional high frequency copper clad laminate, such as low heat resistance, poor humidity resistance, poor processability, and being not fit for the welding procedure of conventional lead-free solder. The prepreg and laminate of the present invention can be applied to multilayer PCBs.

DESCRIPTION OF THE PREFERRED EMBODIMENTS

The present invention relates to a halogen-free flame-retardant resin composition, which comprises, calculating according to the parts by weight of organic solids:

(A) 10-50 parts by weight of copolymer of styrene-maleic anhydride;

(B) 10-50 parts by weight of at least one compound having dihydro benzoxazine ring;

(C) 10-50 parts by weight of at least one polyepoxide;

(D) 5-30 parts by weight of phosphorus-containing flame retardant.

The following detailed description describes the components of the present invention.

The component (A) of the present invention, that is, copolymer of styrene-maleic anhydride (SMA), can further improve the thermal property and electrical property of the polymer and the products made therefrom. The molecular weight of the SMA is between 1400 and 50000. The preferred molecular weight of the SMA is between 1400 and 14400. For example, SMA1000, SMA2000, SMA EF-30, EF-40, EF-60, and EF-80 can be used, which can be obtained in the market. The SMA can be used by itself or can be used after being mixed. The usage amount is 10-50 parts by weight; less styrene-maleic anhydride can not reach the low dielectric constant Dk that is required for high speed and high frequency, and more styrene-maleic anhydride will adversely affect other properties of the laminate, such as the reducing of heat resistance or moisture adsorption. The preferred usage amount is 15-40 parts by weight.

The molecular structural formula of the copolymer of the styrene-maleic anhydride is:

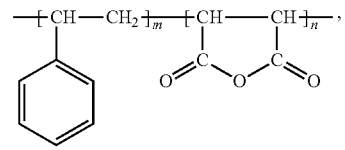

wherein, m:n=1:1, 2:1, 3:1, 4:1, 6:1, or 8:1, and the weight average molecular weight (Mw) is 1300-50000.

The component (B) of the present invention, that is, the compound having dihydro benzoxazine ring, is good for improving the flame-retardant property, moisture adsorption, heat resistance, mechanical property, and electrical property that are required by the cured resin and the substrates made therefrom. The selected benzoxazine resin can be Bisphenol-A benzoxazine resin, Bisphenol-F benzoxazine resin, allyl Bisphenol-A benzoxazine, or MDA (4,4'-Methylenedianiline) benzoxazine resin. Since methylene exists in the molecular structure of Bisphenol-F benzoxazine resin, the framework has a comparatively good toughness while keeping a certain rigidity, and MDA benzoxazine resin has better heat resistance. So, these two kinds of resins are preferred. The benzoxazine resin can be used by itself or can be used after being mixed, and the usage amount is 10-50 parts by weight; the preferred usage amount is 20-45 parts by weight.

The component (C) of the present invention, that is, the polyepoxide, 20 enables the cured resin and the substrates made therefrom to obtain the required basic mechanical and thermal properties. Glycidyl ether series epoxy resin is preferred. Polyepoxide comprises: 1. bifunctional epoxy resin, such as Bisphenol-A epoxy resin, and Bisphenol-F epoxy resin; 2. phenolic aldehyde epoxy resin, such as Phenolic epoxy resin, orthocresol epoxy resin, Bisphenol-A novolac epoxy resin, and Dicyclopentadiene epoxy resin; 3. phosphorus-containing epoxy resin, such as 9,10-dihydro-9-oxa-10-phosphaphenantrene-10-oxide (DOPO) modified epoxy resin, 10-(2,5-dihydroxyphenyl), 10-H-9-oxa-10-phosphaphenanthrene-10-oxide (DOPO-HQ) modified epoxy resin, and 10-(2,9-dihydroxynaphthyl), 10-H-9-oxa-10-phosphaphenanthrene-10-oxide (DOPO-NQ) modified epoxy resin. According to the use, the above mentioned epoxy resin can be used by itself, or can be used after being mixed. For example, a cured resin of using Bisphenol-F epoxy resin has a good toughness; a cured resin of using phenol phenolic aldehyde epoxy resin or orthocresol phenolic aldehyde epoxy resin has a comparatively high glass transition temperature; and a cured resin of using phosphorus-containing epoxy resin is provided with the phosphorous component for flame retardant. The usage amount of epoxy resin is 10-50 parts by weight, and the preferred usage amount is 20-45 parts by weight.

The component (D) of the present invention, that is, the phosphorus-containing flame retardant, is used to improve the combustion performance of the cured resin and the substrates made therefrom. The selected phosphorus-containing flame retardant is at least one of phosphate, compounds of phosphate, compounds of benzoxyphosphazene, phosphaphenanthrene, and derivatives of phosphaphenanthrene. A good phosphorus-containing flame retardant will not reduce the dielectric constant, and for example, compounds of benzoxyphosphazene and compounds of phosphate are good phosphorus-containing flame retardant. The phosphorus-containing flame retardant can be used by itself or can be used after being mixed according to the synergy effect of flame retardant. The usage amount of flame retardant in the present invention is 5-30 parts by weight. If the usage amount is less than 5 parts by weight, the flame retardant effect can not be obtained. If the usage amount is more than 30 parts by weight, other properties of the laminate will reduce, such as the processability, moisture adsorption, and bending strength of the laminate. The phosphorus content of the composition is controlled to be in the range of 1%-5% of the total weight, and the nitrogen content is controlled to be in the range of 1%-5% of the total weight.

A curing accelerator can also be added to the resin composition of the present invention, so as to cure the resin and accelerate the curing speed of the resin. The selected curing accelerator can be any known accelerator that can accelerate the curing speed of thermosetting resin. Applicable accelerators are various kinds of imidazole, tertiary amine, and quanternary ammonium, such as 2-Methylimidazole, 2-Ethyl-4-methylimidazole, 2-Phenylimidazole, 2-Undecylimidazole, benzyl dimethylamine, and 2,4,6-three(dimethylaminemethyl)phenol (DMP-30). 2-Ethyl-4-methylimidazole is recommended to be used. The usage amount of the accelerator is in the range of 0.001%-1% of the total weight of the epoxy resin, benzoxazine resin, and SMA. In most cases, the preferred usage amount of the accelerator is in the range of 0.05%-0.5%.

A filler can also be added to the resin composition of the present invention, so as to adjust some physical properties, such as decreasing the coefficient of thermal expansion (CTE), and increasing the thermal conductivity. The selected filler can be silica (comprising crystalline type, fused type, and spherical silica type), kaolin, boron nitride, aluminum nitride, aluminum oxide, glass fiber, carborundum, or polytetrafluoro ethylene, etc. One or multiple kinds of fillers can be selected according to the requirement. The preferred filler is silica, and the medium particle size of the filler is 1-15 μm. The preferred medium particle size of the filler is 1-10 μm, and the filler with particle size being 1-10 μm has a good dispersion. The usage amount of the filler is in the range of 0%-50% of the total weight of the organic solids in the halogen-free flame-retardant epoxy composition.

The prepreg of the present invention is made by heating and drying the above mentioned halogen-free resin composition with high frequency dielectric property. The prepreg uses nonwoven fabric or other fabric, such as natural fiber, organic synthesis fiber, and inorganic fiber, as the base material. The regular preparation method of the resin composition of the present invention comprises: first adding solids, and then adding a liquid solvent; stirring until the solids are completely dissolved, then adding a liquid resin and an accelerator, and then continuing to stir evenly; finally adding PM (1-Methoxy-2-propanol) solvent to adjust the solid content of the solution to be in the range of 60%-70%, so as to obtain a liquid cement, that is, the halogen-free resin composition with high frequency dielectric property of the present invention; dipping fabric or organic fabric, such as glass cloth, in the liquid cement; heating and drying the impregnated glass cloth in an oven at 160° C. for 3-6 minutes.

The laminate of the present invention comprises two or more than two pieces of prepregs that are bonded together via heating and pressurizing. Metal foils can be bonded to one or two surfaces of the laminate. In the present embodiment, the laminate is made from eight pieces of prepregs and two pieces of one ounce metal foils (35 mm thickness), which are mutually overlapped and then laminated in a laminating machine, so as to produce a laminate with double metal foil surfaces. The lamination should meet the following requirements that: 1. the lamination heating rate generally should be controlled in the range of 1.5-2.5° C./min while the material temperature is in the range of 80-140° C.; 2. while the outer layer material temperature is in the range of 80-140° C., a full lamination pressure, about 350 psi should be applied; 3. while curing, the material temperature is controlled at 195° C. and kept for 90 min. The material of the metal foil is not limited, which can be copper foil, nickel foil, aluminum foil, or SUS foil, etc.

By measuring properties, such as dielectric constant, dielectric dissipation factor, heat resistance, moisture adsorption, glass transition temperature, and flame-retardant property, of the above mentioned produced laminate, the present invention is further detailedly described with the following embodiments.

Please refer to embodiments 1-11, and the comparison example.

The following embodiments are merely examples to explain the present invention, and not to limit the scope of the present invention. Hereinafter, unless special explanation, "%" represents weight percent.

(A) copolymer of styrene-maleic anhydride
SMA-EF40 (Sartomer Company, Inc.);
(B) compound with dihydro benzoxazine
(B-1) LZ8280 (Huntsman Advanced Materials);
(B-2) D125 (Sichuan Dongfang Insulating Material Co., Ltd);
(C) polyepoxide
(C-1) N690 (Dainippon Ink and Chemicals, Incorporated (DIC));
(C-2) XZ92530 (Dow's Chemical Company);
(D) phosphorus-containing flame retardant
(D-1) PX-200 (DAIHACHI CHEMICAL INDUSTRY CO., LTD.);
(D-2) XZ92741 (Dow's Chemical Company);
(E) 2-Ethyl-4-methylimidazole (SHIKOKU CHEMICALS CORPORATION)
(F) filler
spherical silica fine powder (average particle size 1-10 μm, purity over 99%).

TABLE 1

| | Formula of Composition I (parts by weight) | | | | | |
|---|---|---|---|---|---|---|
| | Embodiment 1 | Embodiment 2 | Embodiment 3 | Embodiment 4 | Embodiment 5 | Embodiment 6 |
| A | 16 | 16 | 16 | 16 | 16 | 16 |
| B-1 | 44 | 44 | 44 | | | 24 |
| B-2 | | | | 44 | 44 | 20 |
| C-1 | 18 | | | 18 | | 17 |
| C-2 | | 18 | 23 | | 23 | |
| D-1 | | 22 | | 22 | | |
| D-2 | 22 | | 17 | | 17 | 23 |

TABLE 1-continued

Formula of Composition I (parts by weight)

| | Embodiment 1 | Embodiment 2 | Embodiment 3 | Embodiment 4 | Embodiment 5 | Embodiment 6 |
|---|---|---|---|---|---|---|
| E | appropriate | appropriate | appropriate | appropriate | appropriate | appropriate |
| F-1 | | | | | | |

TABLE 2

Formula of Composition II (parts by weight)

| | Embodiment 7 | Embodiment 8 | Embodiment 9 | Embodiment 10 | Embodiment 11 | comparison example |
|---|---|---|---|---|---|---|
| A | 31 | 31 | 31 | 48 | 12 | 16 |
| B-1 | | 29 | | | 26 | |
| B-2 | 29 | | 23 | 16 | 20 | |
| C-1 | 17 | | 10 | 13 | 24 | 57 |
| C-2 | | 23 | 13 | | | |
| D-1 | 23 | | | 23 | | |
| D-2 | | 17 | 23 | | 18 | 27 |
| E | appropriate | appropriate | appropriate | appropriate | appropriate | appropriate |
| F-1 | 20 | 20 | 20 | 20 | 20 | 20 |

TABLE 3

Characteristic Valuation I

| | Embodiment 1 | Embodiment 2 | Embodiment 3 | Embodiment 4 | Embodiment 5 | Embodiment 6 |
|---|---|---|---|---|---|---|
| glass transition temperature (Tg, °C.) | 173 | 164 | 155 | 195 | 161 | 182 |
| peel strength (N/mm) | 1.25 | 1.24 | 1.31 | 1.27 | 1.30 | 1.24 |
| flame-retardance | V-0 | V-0 | V-0 | V-1 | V-0 | V-1 |
| solder dipping (delaminating) | ○ | ○ | ○ | ○ | ○ | ○ |
| solder dipping (crazing) | ○ | ○ | ○ | ○ | ○ | ○ |
| moisture adsorption (%) | 0.22 | 0.21 | 0.19 | 0.19 | 0.20 | 0.17 |
| dielectric constant (1 GHz) | 4.0 | 4.0 | 4.0 | 4.0 | 4.0 | 4.0 |
| dielectric loss (1 GHz) | 0.006 | 0.006 | 0.006 | 0.006 | 0.006 | 0.006 |
| flexural strength (N/mm2) | 610 | 590 | 630 | 640 | 615 | 530 |
| halogen content (%) | 0.03 | 0.03 | 0.03 | 0.03 | 0.03 | 0.03 |

TABLE 4

| Characteristic Valuation II | | | | | | |
|---|---|---|---|---|---|---|
| | Embodiment 7 | Embodiment 8 | Embodiment 9 | Embodiment 10 | Embodiment 11 | comparison example |
| glass transition temperature (Tg, °C.) | 153 | 147 | 145 | 137 | 203 | 171 |
| peel strength (N/mm) | 1.32 | 1.31 | 1.20 | 1.28 | 1.23 | 1.35 |
| flame-retardant property | V-1 | V-0 | V-0 | V-1 | V-1 | V-0 |
| solder limits (delaminating) | ○ | ○ | ○ | ○ | ○ | ○ |
| solder limits (crazing) | ○ | ○ | ○ | ○ | ○ | ○ |
| moisture adsorption (%) | 0.17 | 0.19 | 0.17 | 0.21 | 0.15 | 0.35 |
| dielectric constant (1 GHz) | 4.0 | 3.8 | 3.9 | 3.8 | 4.1 | 4.0 |
| dielectric loss (1 GHz) | 0.006 | 0.006 | 0.006 | 0.006 | 0.006 | 0.015 |
| bending strength (N/mm2) | 540 | 505 | 490 | 550 | 510 | 620 |
| halogen content (%) | 0.03 | 0.03 | 0.03 | 0.03 | 0.03 | 0.03 |

Test method of the above mentioned characteristics is described as follows.

(a) Glass Transition Temperature

According to differential scanning calorimetry, glass transition temperature is measured by the DSC method stated in IPC-TM-650 2.4.25.

(b) Peel Strength

According to the experiment condition of "After Thermal Stress" in the method stated in IPC-TM-650 2.4.8, the peel strength of metal cover layer is measured.

(c) Flame-Retardance

Flame-retardance is measured according to the standard of UL94.

(d) Solder Dipping

The sample (a substrate of 100×100 mm) is kept for 2 hours in a pressure cooking processing device at 121° C. at 105 kPa, then it is impregnated in a solder bath at 260° C. for 20 seconds; by visual inspection, it is viewed whether delaminating exists or not, and it is also viewed whether crazing exists or not. In the tables, symbol ○ represents that nothing changes; symbol Δ represents that crazing occurs; symbol X represents that delaminating occurs.

(e) Moisture Adsorption

Moisture adsorption is measured according to the method stated in IPC-TM-650 2.6.2.1.

(f) Dielectric Constant and Dielectric Dissipation Factor

By the resonance method using striplines, dielectric constant and dielectric dissipation factor at 1 GHz are measured according to IPC-TM-650 2.5.5.5.

(g) Flexural Strength

According to the method stated in IPC-TM-650 2.4.4, at room temperature, loads are applied to the sample of specific dimension and shape to measure.

(h) Halogen Content

According to Test Method for Halogen-free Materials stated in JPCA-ES-01-2003, the halogen content of copper clad laminate is measured by oxygen flask combustion method and ion chromatography.

In summary, the present invention can achieve the effects of low dielectric constant, low dielectric dissipation factor, high glass transition temperature, high flame-retardant property, high solder dipping, low moisture adsorption, and good laminate processability. At the same time, the present invention measures up UL94 V-0 standard about flammability test, with the halogen content being within the halogen-free standard range of JPCA. The present invention makes the most of the synergy property of copolymer of styrene-maleic anhydride, benzoxazine resin, and epoxy resin, and the halogen content is less than 0.09%, so as to achieve environmental protection. Besides, the PCB made of the resin matrix of the present invention not only has the mechanical property and heat resistance property equal to a general FR-4 PCB, but also has a very excellent high-frequency dielectric property, which can meet the requirements of a high frequency transmission system to a PCB.

Although the present invention has been described in detail with above said embodiments, but it is not to limit the scope of the invention. So, all the modifications and changes according to the characteristic and spirit of the present invention, are involved in the protected scope of the invention.

What is claimed is:

1. A halogen-free resin composition with high frequency dielectric property, calculating according to the parts by weight of organic solids, the total parts by weight of the organic solids being 100, comprising:
 (A) 10-50 parts by weight of copolymer of styrene-maleic anhydride;
 (B) 10-50 parts by weight of at least one compound having dihydro benzoxazine ring;
 (C) 10-24 parts by weight of at least one polyepoxide; and
 (D) 5-30 parts by weight of at least one phosphorus-containing flame retardant;
 wherein the molecular structural formula of the copolymer of styrene-maleic anhydride is:

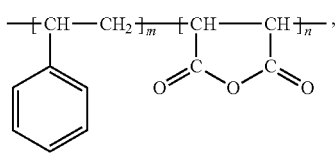

wherein, m:n=1:1, 2:1, 3:1, 4:1, 6:1, or 8:1, and the weight average molecular weight is 1300-50000;

wherein the compound having dihydrobenzoxazine ring is at least one compound of Bisphenol-A benzoxazine resin, Bisphenol-F benzoxazine resin, allyl Bisphenol-A benzoxazine, and MDA (4,4'-Methylenedianiline) benzoxazine resin;

wherein the polyepoxide comprises at least one of the following compounds:

(1) bifunctional epoxy resin, selected from the group consisting of Bisphenol-A epoxy resin and Bisphenol-F epoxy resin;

(2) phenolic aldehyde epoxy resin, selected from the group consisting of Phenolic novolac epoxy resin, Bisphenol-A novolac epoxy resin, orthocresol novolac epoxy resin, and Dicyclopentadiene novolac epoxy resin;

(3) phosphorus-containing epoxy resin, selected from the group consisting of 9,10-dihydro-9-oxa-10-phosphaphenanthrene-10-oxide (DOPO) modified epoxy resin, 10-(2,5-dihydroxyphenyl)-10-H-9-oxa-10-phosphaphenanthrene-10-oxide (DOPO-NQ) modified epoxy resin, and 10-(2,9-dihydroxynaphthyl)-10-H-9-oxa-10-phosphaphenanthrene-10-oxide (DOPO-NQ) modified epoxy resin;

wherein the phosphorus-containing flame retardant is at least one of phosphate compounds, and benzoxyphosphazene compounds.

2. The halogen-free resin composition with high frequency dielectric property of claim 1, wherein the phosphorus content of the composition is controlled to be in, the range of 1%-5% of the total weight, and the nitrogen content is controlled to be in the range of 1%-5% of the total weight.

3. The halogen-free resin composition with high frequency dielectric property of claim 1, wherein the halogen content of the composition is controlled to be less than 0.09% of the total weight.

4. A prepreg made from the halogen-free resin composition with high frequency dielectric property of claim 1, comprising a base material, and the halogen-free resin composition with high frequency dielectric property; the resin composition adhering to the base material after the base material being impregnated in the resin composition and then being dried.

5. The prepreg of claim 4, wherein the base material is nonwoven fabric or other fabric.

6. A laminate made from the halogen-free resin composition with high frequency dielectric property of claim 1, comprising a plurality of prepregs mutually overlapped; each prepreg including a base material and the halogen-free resin composition with high frequency dielectric property; the resin composition adhering to the base material after the base material being impregnated in the resin composition and then being dried.

* * * * *